(No Model.) 2 Sheets—Sheet 1.
M. BACHERT & D. W. O'NEIL.
PRESERVED WOOD AND PROCESS OF PREPARING SAME.
No. 602,713. Patented Apr. 19, 1898.
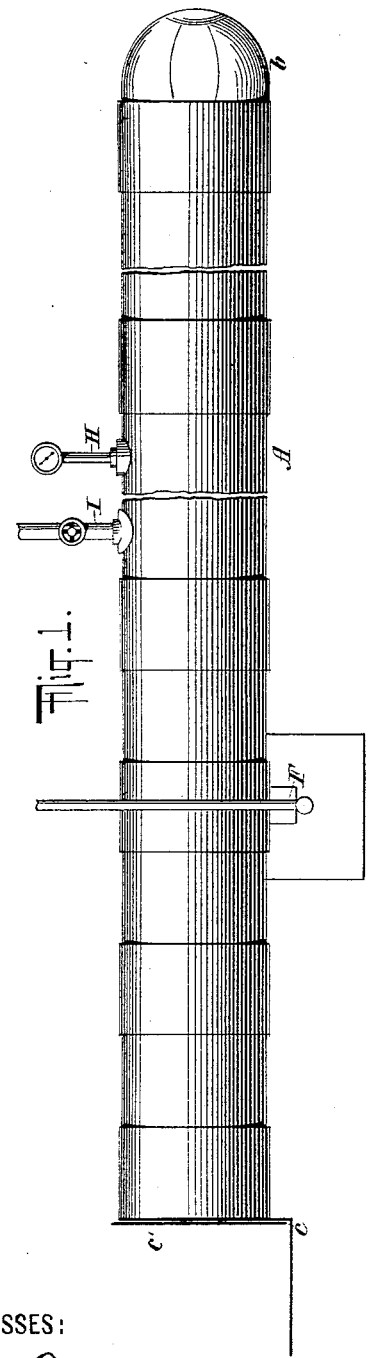
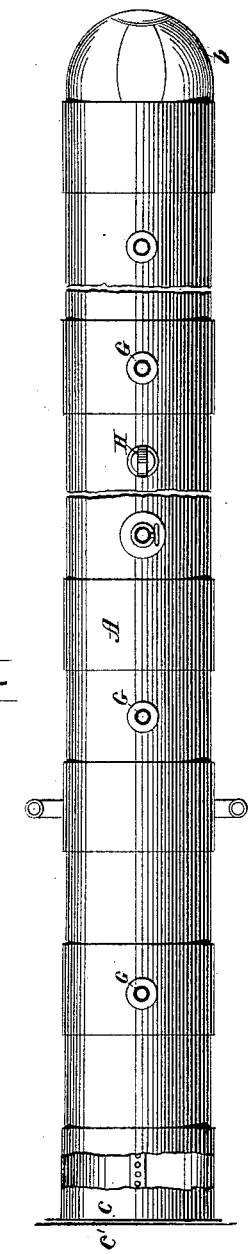
WITNESSES:
INVENTORS
Max Bachert
David Webster O'Neil
BY Briesen J Knauth
ATTORNEYS (No Model.) 2 Sheets—Sheet 2.
M. BACHERT & D. W. O'NEIL.
PRESERVED WOOD AND PROCESS OF PREPARING SAME.
No. 602,713. Patented Apr. 19, 1898.
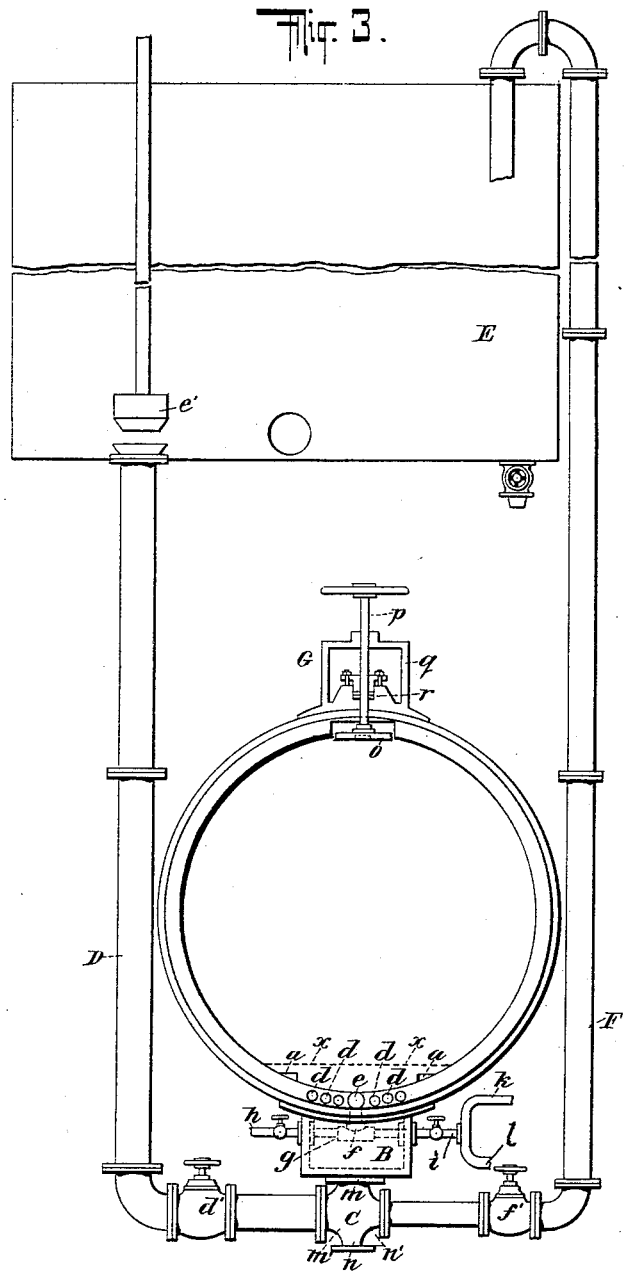

UNITED STATES PATENT OFFICE.

MAX BACHERT, OF NEW YORK, N. Y., AND DAVID WEBSTER O'NEIL, OF NEWARK, NEW JERSEY, ASSIGNORS TO THE ELECTRIC FIREPROOFING COMPANY, OF NEW YORK, N. Y.

PRESERVED WOOD AND PROCESS OF PREPARING SAME.

SPECIFICATION forming part of Letters Patent No. 602,713, dated April 19, 1898.

Application filed March 1, 1898. Serial No. 672,164. (No specimens.)

*To all whom it may concern:*

Be it known that we, MAX BACHERT, of the borough of Manhattan, in the city, county, and State of New York, and DAVID WEBSTER O'NEIL, of the city of Newark, in the county of Essex and State of New Jersey, have invented certain new and useful Improvements in Impregnating Wood, of which the following is a specification.

Our invention relates to cellulose preservation by saturation or impregnation.

The invention consists in preserving cellulose, such as wood, by completely saturating it uniformly through and through by an atmosphere surcharged with aqueous vapor. Every fiber or pore of the cellulose is thus fully opened or expanded. The water of condensation is then withdrawn from the cellulose. While its cells are opened, this water is replaced by a liquid-preserving compound which penetrates every fiber of the cellulose. The material is then slowly dried. The solid particles of the preservative are uniformly deposited throughout every fiber of the cellulose.

Commercial lumber or wood is that form of cellulose to which we have found our invention admirably adapted, and fireproofing the kind of preserving to which at present we have given special attention. Our invention is, however, applicable to all forms of cellulose and all kinds of preservatives.

The invention for illustrative purposes will be described in connection with the fireproofing of commercial wood; but its application, as stated above, is of wider scope.

The first step of enveloping the wood in an atmosphere surcharged with aqueous vapor, preferably at a low pressure—say from 110° to 200° Fahrenheit—in a closed chamber, within which the wood is placed, is of great importance. A higher temperature can be used with some kinds of woods. This process of saturation makes a sponge of the wood by opening its cells and pores throughout. The preliminary saturation may be a continuous or an intermittent process. If live or dry steam be used and maintained at a high temperature, a discoloration of the wood results, injuring and destroying its natural beauty and color. The elasticity of the wood is impaired. Its tensile strength is weakened. Moreover, such heat will not open the cells of the wood. The outer surface becomes sealed by this character of heat, forming an impenetrable outer shell which effectually resists the passage of the preservative fluid. In addition the effect of such heat tends to distort the wood and concave its edges or sides. In the use of such aqueous vapor at low temperature the pores or cells of the wood are opened. The wood retains its color. Its elasticity and tensile strength are unimpaired. After the enveloping of the wood in such surcharged atmosphere the saturated wood is then evaporated, preferably by a vacuum caused in a closed chamber, which leaves the pores or cells fully opened and receptive of the preservative compound. The vacuum may be continuous or may be broken and reëstablished, as desired, to effect the required evaporation. The wood is then submerged and saturated in a preservative fluid admitted to the closed chamber, where the liquid is maintained under pressure and the preservative forced into the heart of the wood and into every pore and fiber thereof. The wood is then dried at a low temperature—say from 85° to 125°—slowly. After this last step of the process the product is complete for any use to which it may be put or fashioned. Under the process it has neither warped nor shrunk. It retains its original color, its tensile strength, and its elasticity.

If the preservative liquid employed in the process has been a fireproofing compound—such, for instance, as sulfate of ammonia and phosphate of ammonia—the shavings of this product taken from the very heart or sap absolutely will not burn. The blowpipe-flame applied to the wood will not burn the wood. After a long time under this fierce heat the surface will char slightly; but there is no blaze or fire remaining when the blowpipe is removed.

The product thus treated has great and increased non-conducting properties. A blowpipe-flame directed against a piece of half-inch wood for a considerable time does not warm the wood upon the opposite side.

Live electric wires with no insulation may be safely laid against woodwork, fixtures, or the like made from this wood, as no flame arises.

Wood-staining is generally a preservative and may be used with or without the fireproofing compound. By the word "preservative" is meant to include all filler and staining compounds also.

In the accompanying drawings we have shown an apparatus for carrying out our invention; but it will be understood that this apparatus is capable of great variation, depending upon the material to be operated upon and the conditions of operation.

In the drawings, Figure 1 is a broken-away side elevation of a cylinder suitable for inclosing the wood to be treated. Fig. 2 is a plan view thereof, and Fig. 3 is an enlarged sectional elevation of the cylinder and the liquid-containing tank and the piping appertaining to the same.

In the drawings, A is a cylinder in which the wood to be treated is inclosed. This cylinder is preferably of metal about three quarters of an inch thick in order to withstand the internal pressure to which the cylinder is subjected in use. This cylinder is shown as provided with rails $a$, upon which cars containing the lumber to be treated are run. It is likewise shown as closed at one end $b$, and is open at the other end $c$ in order to admit the cars, which end $c$ is adapted to be closed by a head $c'$, which is put in place and bolted securely to the cylinder after the lumber to be treated has been placed in the cylinder, so as to entirely close the cylinder except at the points where the pipe or pipes for conveying steam or liquid thereto enter. At the bottom or other convenient place inside the cylinder is a steam-coil comprising a series of steam-pipes $d$, which run the length of the cylinder. These pipes receive steam to heat the contents of the cylinder. Located adjacent to these pipes, within the cylinder and running the length thereof, is a pipe $e$, which is apertured and the apertures of which increase gradually in size throughout its length from the point of entrance of the steam, so as to deliver the same quantity of fluid at all points. These pipes may be covered with a body of water. The pipe $e$ serves to bring steam to the cylinder and connects with a pipe $f$, which leads outside of the cylinder to a T-coupling $g$, to which a pipe $h$ is connected on one side. This pipe $h$ leads from the pressure-pump (not shown) and serves to bring liquid to the cylinder from the pressure-pump at a suitable time, as will be explained. A pipe $i$ connects to the opposite side of the T and serves to admit steam to the cylinder through pipes $f$ and $e$ at the appropriate time and to exhaust the same therefrom. This pipe is provided with a plurality of branch pipes $k\ l$, the source of steam-supply being connected to the pipe $l$ and the pipe $k$ being an exhaust-pipe.

B is the mud-drum of the cylinder, which is connected to a cross-coupling C by one arm $m$ of the said coupling, the opposite arm $n$ of the said coupling preferably serving as a vent to clear out the mud-drum. Connected to the arm $m'$ is a pipe D, which may be provided with a valve $d'$ and leads to the bottom of a tank E, containing the fireproofing solution. A valve $e'$ serves to govern and control the exit of liquid from the tank into the pipe D, the valve $d'$ serving to control the passage of liquid through the pipe to the cylinder. Connected to the other arm $n'$ of the coupling C is a pipe F, provided with a valve $f'$ and leading to the tank E. This pipe serves to return the unexpended liquid from the cylinder to the tank E. Located along the top of the cylinder is a series of pressers G, each of which consists of a follower $o$, carried upon a screw-shaft $p$, working in a bracket $q$, and passing through a stuffing-box $r$. These pressers when screwed down upon the lumber in the cylinder serve to hold the said lumber firmly in place during the operation. The cylinder may likewise be provided with one or more thermometers H for indicating the temperature of the interior of the cylinder. The cylinder may likewise be provided with a pipe I, which is provided with the usual stop-cock and may be connected to an air-pump or to a condenser.

The mode of operating the apparatus shown to fireproof wood is as follows: The lumber placed upon cars is run into the cylinder, the cars running on the rails $a$. The head of the cylinder is put in place and the pressers screwed down upon the lumber to hold it firmly. After the lumber has been placed in the cylinder water may be introduced to the depth of from three to six inches, all the valves of the apparatus, with the exception of the steam-pipe valve, are closed, and steam at low pressure and temperature is introduced, passing through the pipes $l$, $i$, $g$, $f$, and $e$ and into the open part of the cylinder through the body of water $x$ for a period of from one to eight hours. This steaming is continued and the temperature in the cylinder being maintained, say, between 110° to 200° Fahrenheit, depending upon the kind of wood to be treated, and the moisture thoroughly penetrates the wood. This step of the process is quite important, as the effect of such steaming is to open the pores of the wood and fill the same with moisture. At the proper time, determined by practice, the steam is shut off and the valve leading to the vacuum-pump opened. Thereupon the vacuum or air pump is started, which has the effect of exhausting air and steam from the cylinder and causing the moisture to rapidly evaporate out of the wood, leaving the pores of the wood open. The vacuum is maintained until the wood has been robbed of a great amount of its moisture and practically reduced to its original weight; but the vacuum should be broken about every three hours, so that the accumulated water of condensation in the cylinder may be drawn off. When the lumber has been dried and the water of condensation drawn off, the openings of the cylinder should again be closed and another vacuum formed, say from twenty to twenty-eight inches. The preserving solution is then let in by opening the valves $d'$ and $e'$ and allowing the liquid to flow from the tank E through the pipe D into the cylinder. This solution is allowed to fill the cylinder, and then the liquid should be shut off by closing the valves $e'$ and $d'$. The valve of the air-pump pipe $h$ is then closed and the pressure-pump set in operation to pump liquid into the cylinder through the pipe $k$, whose cock has been opened for that purpose. The pressure-pump forcing liquid into the cylinder subjects the liquid in the cylinder to a considerable pressure, thereby forcing the said liquid into the pores of the wood. These pores, being very thoroughly opened by the steaming and the subsequent drying in the vacuum, readily receive the liquid, so that the lumber is very thoroughly permeated and saturated with the liquid. The liquid may be warmed in the cylinder by passing steam through the steam-coils $d$. When the lumber has been very thoroughly saturated, the liquid is drawn off from the cylinder and pumped back into the tank through the pipe F. The lumber, being saturated with the liquid, is now slowly evaporated in order to leave the solid ingredients of the solution uniformly distributed in the pores of the wood. The wood is now slowly dried at a low heat.

Hard wood, such as mahogany and large ship timbers and other hard woods, can be as thoroughly impregnated with the preserving compound as can thin quarter-inch soft wood.

Especial stress is laid upon the wood retaining its natural color under our process in order to take the usual light oil and varnish decorations and the like under the methods in vogue for treating wood which has not been fireproofed. In the hot or dry heat processes in use many light woods are darkened or discolored from dark shades to that approaching the color of mahogany and rendered useless for the originally-designed purpose.

The difference which exists between this particular product and the mode of obtaining the same and those which are and have been in common practice are, although important, not apparent at first glance. It is all the difference between success and failure, and heretofore it has been supposed that either live steam or any heat of equivalent temperature were necessary to fit the wood for proper preservation. This is apparent from the modes followed in vulcanizing wood wherein the albuminous constituents, &c., are sought to be retained in the hardened condition. A like hardened and repellent surface was always produced where such high temperatures were used, either to season or to unseason the wood preliminary to impregnation. The elasticity of the timber to the full extent of its treatment with high temperature was permanently impaired and the color changed, so as to render it useless where light effects were desired. The product of such previous process was brittle, discolored, and unfit for a great many purposes to which this product can be readily applied. The uniform impregnation and the retaining of its original elasticity leaves it capable of uniform bending or other manipulation, and when dressed down its surfaces, no matter to what degree planed, are equally fireproofed or preserved.

What we claim, and desire to secure by Letters Patent, is—

1. The herein-described method of saturating wood with preservatives, which consists in inclosing the same within a receptacle, enveloping the wood in an atmosphere surcharged with aqueous vapor at the temperature substantially as specified, to soften and open the same; removing the vapor or water from the chamber and contents; and then impregnating the wood uniformly throughout with wood-saturating material under pressure; and finally drying the same slowly at a low drying temperature, as set forth.

2. The process of preserving and fireproofing wood, which consists in saturating or opening its very fiber and cell throughout with aqueous vapor at low pressure and temperature as specified; then removing the vapor or water from the wood; then impregnating the open fiber uniformly through and through with a fireproofing solution under pressure, and finally drying the wood slowly at a low drying temperature, substantially as set forth.

3. The process of preserving and fireproofing wood which consists in enveloping the same within a closed receptacle with an atmosphere saturated with aqueous vapor maintained at about 110° to 200° Fahrenheit to soften and open the wood; then producing a vacuum and removing the vapor and water from the wood; impregnating the wood uniformly throughout with fireproofing solution under pressure, and finally drying the wood at a temperature ranging from 85° to 125° Fahrenheit, substantially as set forth.

4. The hereinbefore-described product, being fireproofed wood impregnated uniformly throughout, and retaining its natural color, elasticity and tensile strength, substantially as set forth.

MAX BACHERT,
DAVID WEBSTER O'NEIL.

Witnesses:
HENRY G. CHRISTIANSON,
GEO. E. MORSE.